Figure 1:
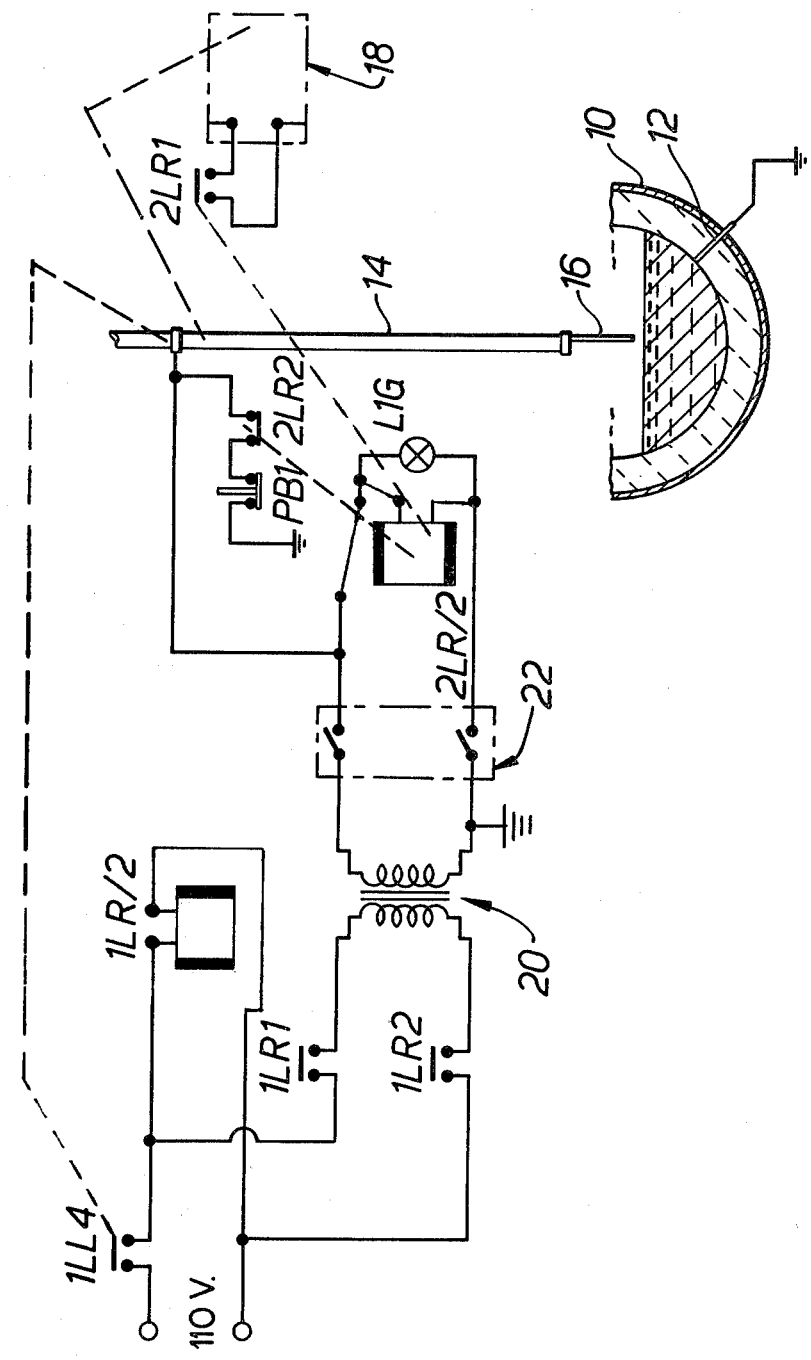

United States Patent [19]

Hill et al.

[11] 4,223,442
[45] Sep. 23, 1980

[54] DISTANCE MEASUREMENT

[75] Inventors: Kerry Hill, Bakewell; Edward Butterworth, Sheffield, both of England

[73] Assignee: British Steel Corporation, England

[21] Appl. No.: 934,252

[22] Filed: Aug. 16, 1978

[30] Foreign Application Priority Data

Aug. 26, 1977 [GB] United Kingdom ............... 35930/77

[51] Int. Cl.³ ............................................ G01F 23/00
[52] U.S. Cl. ............................. 33/126.7 A; 33/169 B; 73/304 R; 73/DIG. 9
[58] Field of Search ................. 33/126.7 R, 126.7 A, 33/169 B, 169 R, 126.4, 126.5; 73/DIG. 9, 421, 290 R, 304 R, 304 C, 298; 336/30, 220, 224

[56] References Cited
U.S. PATENT DOCUMENTS

| | | | |
|---|---|---|---|
| 2,053,938 | 9/1936 | Barker, Jr. ...................... | 33/126.7 A |
| 3,494,200 | 2/1970 | Mihalow et al. ................ | 73/DIG. 9 |
| 3,909,948 | 10/1975 | Markfelt .............................. | 33/126.5 |
| 3,996,801 | 12/1976 | Playfoot et al. ................... | 73/304 R |
| 4,003,260 | 1/1977 | Catoul ............................. | 73/DIG. 9 |

*Primary Examiner*—Willis Little
*Attorney, Agent, or Firm*—Jesse B. Grove, Jr.

[57] ABSTRACT

The invention is concerned with establishing the datum level of a lance or cartridge relative to the surface of a bath of molten metal in a metallurgical vessel. A voltage is applied to the movable lance or cartridge in such manner that contact of the lance or cartridge with the bath surface causes an earth leakage current to be established. Electrical circuitry is incorporated to open a circuit breaker upon flow of a predetermined earth leakage current and actuate an indication on a distance measuring device coupled to the movable lance or cartridge.

11 Claims, 4 Drawing Figures

DISTANCE MEASUREMENT

This invention relates to apparatus and method for measuring the separation between relatively movable objects. More particularly the invention relates to the measurement of the height of a movable lance above the level of molten ferrous metal in a container and is also concerned with the continuous indication of either the height of a lance above, of the depth of immersion below, the molten metal level.

In steelmaking practice in a metallurgical vessel an overhead generally vertically movable lance is frequently utilised to blow oxygen onto the surface of the melt. Also generally vertically movable lances are frequently employed to sample molten metal in metallurgical vessels. In both these situations it is important to be able to determine accurately the relative separation between the lance tip and bath level since, in the first case, the height of the oxygen lance can affect the reaction in the melt and, in the second case, sampling is generally required to be carried out at a predetermined depth below the bath surface.

Methods of measuring the relative separation between a lance and a bath of molten ferrous metal have been proposed. For example, it is known to electrically insulate a lance and equip it at its tip with an elongate electrical conductor of predetermined length, apply a low voltage to the conductor and utilise a meter connected between the conductor and the earthed vessel to sense contact between the conductor and molten metal within the vessel as the lance is lowered. At this point a datum position is established, based on the known predetermined length of conductor, against which subsequent lance movements can be related on appropriate distance measuring equipment connected to the movable lance. This short circuit technique is not always satisfactory since the low voltage, which is necessary for safety reasons, cannot always overcome the electrical resistance which is sometimes present in the slag layer of the bath. Furthermore, such a circuit is not always capable of rapid automatic contact closure to effect instantaneous injection of the signal of the predetermined conductor length into the distance measuring equipment. For example, even with the lance being lowered at a slow speed, a delay of 1 second between initial contact and signal injection could result in a distance error in excess of 30 mm.

Another proposal involving the use of a gas pressure operated switch is described in British Pat. No. 1455518 wherein it is desired to know the depth of a sampling probe within a bath of molten metal.

It is an object of the present invention to provide improved apparatus and method for measuring the separation between two relatively movable objects.

In accordance with one aspect of the invention there is provided apparatus for determining the separation between first and second relatively movable objects comprising means for applying an electrical voltage to a first one of said objects, and earth leakage current detection means operable, upon establishment of an earth leakage current from said first object to earth when said first object contacts said second object, to initiate a reading on distance measuring means for recording the separation between the two objects.

Also in accordance with the invention there is provided a method of determining the separation between first and second relatively movable objects comprising applying an electrical voltage to a first one of said objects, moving one of said objects towards the other, detecting the establishment of an earth leakage current from said first object to earth when said first object contacts said second object, and utilizing said earth leakage current to initiate a reading on distance measuring means for recording the separation between the two objects.

The distance measuring means may be presettable at a predetermined distance between the two objects to be actuable, on establishment of said earth leakage current, to record said predetermined distance and thereafter to be operable to record subsequent variations from said predetermined distance upon relevant movement between said two objects. Said first object may be an oxygen lance, a sampling lance or a disposable cartridge and said second object may be the surface of a bath of molten metal contained within a metallurgical vessel; the lance or cartridge being movable towards and away from such surface.

An elongate electrical conductor of predetermined length may be secured to the lance tip so that the earth leakage current is established from the lance upon contact of the conductor with the metal bath; said predetermined length then being recorded on the distance measuring means as an indication of the separation between the lance tip and the bath surface.

The bath of molten metal may conveniently be earthed by means of an earth probe passing through the vessel wall to contact the bath; the earth leakage current path then being established from the lance to the metal bath upon contact of the conductor therewith.

An elongate electrical conductor is conveniently utilised as aforesaid on an oxygen lance wherein the height of the lance above the bath is required to be accurately and quickly recorded and wherein the lance does not actually become immersed in the bath. When a sampling lance is utilised, which is to be immersed in the metal bath to a predetermined depth, the elongate conductor may be dispensed with, the contact of the tip of the lance itself with the bath surface will then establish the earth leakage current from the lance through the bath to the earth probe. In such an arrangement the presettable predetermined distance on the distance measuring means will be zero.

Alternatively the earth probe may be dispensed with and an earth conductor may be mounted on the lance of the same length as the elongate conductor but electrically insulated therefrom; the earth leakage current path then being established, upon contact with the bath, from the conductor through the bath to the earth connector.

Figure 2:
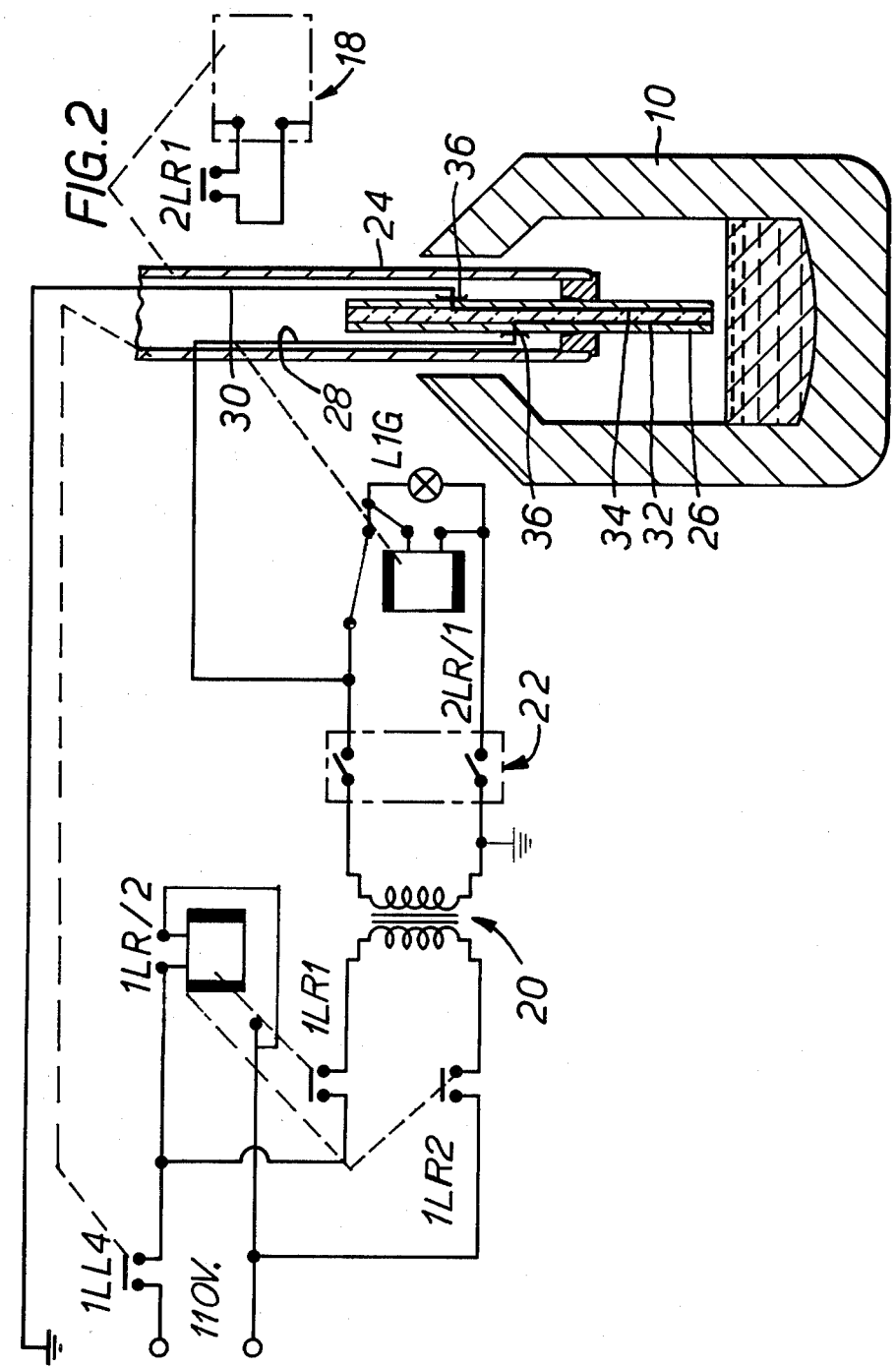
Figure 3:
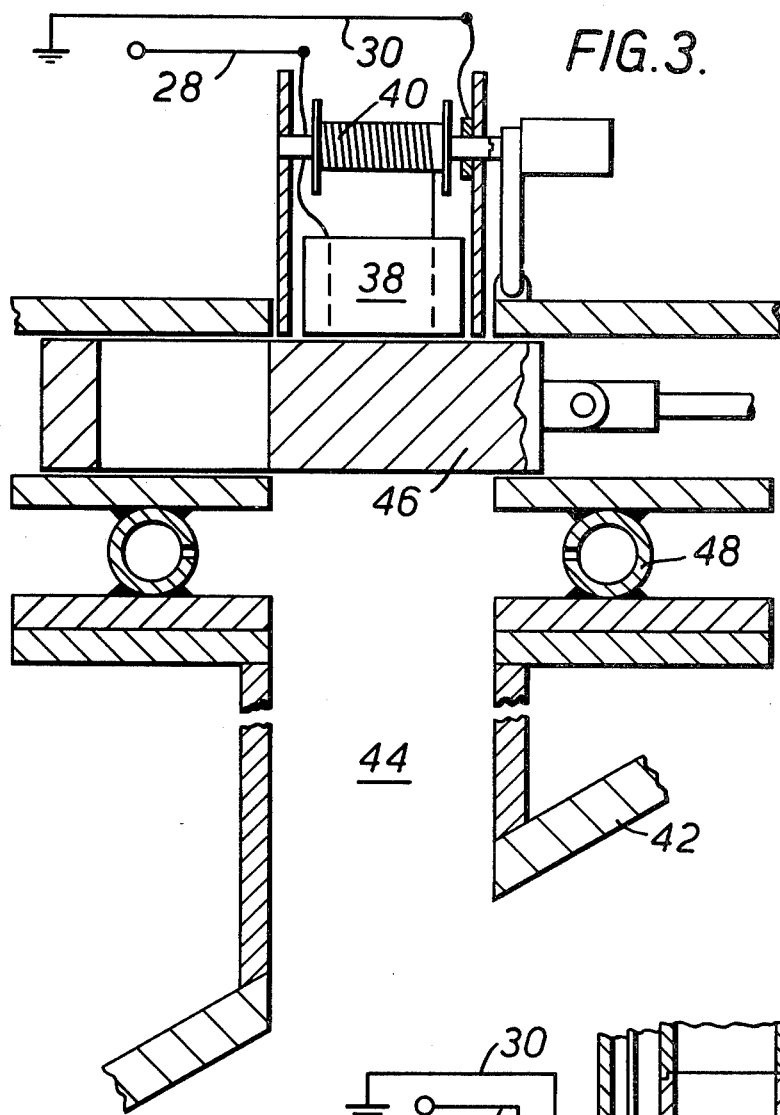
Figure 4:
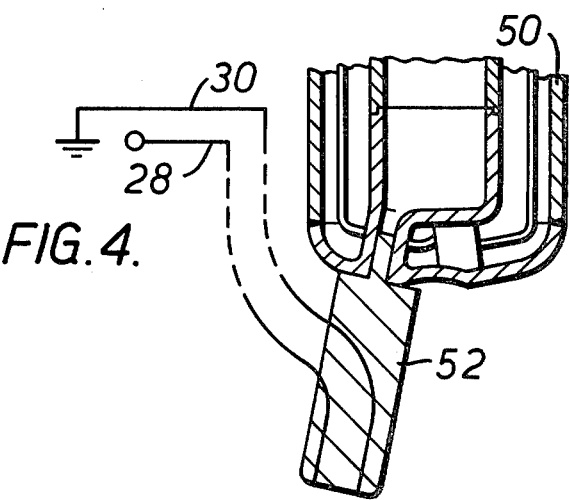

Other features of the invention will become apparent from the following description given herein solely by way of example with reference to the accompanying drawings wherein like numerals refer to the like parts throughout the several views and wherein:

FIG. 1 is a diagrammatic representation of the electrical circuitry required for determining the height of an oxygen lance above a bath of molten metal in a metallurgical vessel, FIG. 2 shows similar electrical circuitry to that shown in FIG. 1 but as used for determining a datum level for a submersible secondary lance, FIG. 3 is a cross-sectional view at the hood of a metallurgical vessel showing an alternative device for establishing a datum level, and FIG. 4 is a cross-sectional view of the discharge end of a triple port oxygen lance having a consumable cartridge in one port.

In the drawing there is shown diagrammatically the lower part of a refractory lined metallurgical vessel 10 which may conveniently be a BOS converter for refining steel. An earth probe 12 is shown extending through the refractory lining to contact the molten metal in the vessel whilst a vertically movable overhead oxygen lance 14 is shown above the bath surface. An elongate electrical conductor 16 of known predetermined length is secured to the lower end of the lance conveniently by a push-on interference fit.

Distance measuring equipment 18 is connected to the movable lance 14; such equipment conveniently comprising a Teletrac digital read-out system as manufactured by Whitwell Electronic Developments Ltd. Such equipment is cable driven and the cables may conveniently be attached to the oxygen lance counter-weights so that every movement of the lance is continuously indicated on the measuring equipment. Such equipment may be calibrated by injecting a presettable predetermined reading and, in accordance with the invention, the reading to be injected will be the length of the electrical conductor 16. For example, if the conductor 16 has a length of 1 meter such a value is preset on the measuring equipment 18 and that reading will be injectable as a datum reading against which further variation in the lance height will be continuously recorded on the equipment. The means by which this datum reading is injected is further described herein.

The electrical circuitry illustrated in the drawing conveniently uses a 110 volt input controlled by limit switch 1LL4 actuated automatically by the oxygen lance 14 as it descends below the convertor hood. Closure of switch 1LL4 supplies a current through relay 1LR/2 which in turn closes its associated switches 1LR1 and 1LR2 in the primary circuit of an isolating transformer 20. The secondary circuit of the transformer delivers 110 volts through a current operated earth leakage circuit breaker 22 which may conveniently be of the type manufactured by the MCB Company (Lupus) Ltd. When the circuit breaker is closed current flows through the relay 2LR/2 and indicating lamp L1G to close associated switch 2LR1 and open switch 2LR2. At this juncture the 110 volts supplied from the secondary circuit of the transformer 20 is applied to the lance 14 and the indicating lamp L1G indicates that the lance is live.

Switch 2LR1 is on the distance measuring equipment 18 in an appropriate circuit such that opening of switch 2LR1 will inject the predetermined datum reading as will be further described. Switch 2LR2 is in an earth line from the lance 14 and will thus, when open, ensure that current cannot flow to earth through this line.

The earth leakage circuit breaker 22 comprises a balanced network incorporating a trip coil actuable upon passage of a current of approximately 30 milli-amps to open the circuit breaker.

In use therefore the lance 14 is lowered towards the metal bath and as soon as the lower end of the conductor 16 on the lance contacts the bath surface on earth leakage current will flow from the conductor 16 through the bath and the earth probe 12 to earth. Establishment of this earth leakage current will cause the circuit breaker 22 to trip thereby taking the transformer secondary current off relay 2LR/2 and opening its associated switch 2LR1 whilst closing 2LR2. As mentioned previously, opening of 2LR1 will inject the datum reading, which in this example is the 1 meter length of the conductor 16, into the distance measuring equipment 18 and this will be done instantaneously upon establishment of a leakage current as low as 30 milli-amps. The distance measuring equipment 18 continues to indicate from this datum the height of the lance tip above the path surface.

The closure of switch 2LR2 establishes earthing of the lance 14 whilst the 110 volts supplied thereto has of course been cut off by tripping of the circuit breaker 22. The earth line through 2LR2 and manual push button switch PB1 is a safety feature for earthing the lance against build-up of static electricity.

The apparatus described therefore enables an instantaneous and accurate measurement of a predetermined separation between the lance tip and the bath surface to be obtained with subsequent continuous recordal of variations from this predetermined separation. Thus in the example described herein an accurate and continuous reading of the height of the lance tip above the bath surface can be obtained. In FIG. 2 of the drawings there is illustrated similar electrical circuitry to that described with reference to FIG. 1 but being intended for use with a submersible secondary lance 24 having a cartridge of the type used for example, for the determination of carbon level by thermo-couple measurement of liquidus arrest temperature.

In such an arrangement the lance 24 is movable vertically towards and away from the metal bath in the vessel 10. The lance 24 contains a disposable cartridge 26, successive ones of which can be fed into position from a cartridge magazine located above the vessel, and selected cartridges are equipped with two electrical conductors 32-34 electrically insulated one from another and extending to the lower end of the cartridge. The live lead 28 from the electrical circuitry and an earth lead 30 are connected via slip rings 36 in the lance to the respective conductors 32 and 34.

It will be noted that the electrical circuitry with reference to this embodiment differs from that of FIG. 1 in that the earth probe 12 is dispensed with as are also switches 2LR2 and PB1 and that relay 2LR/2 is replaced by relay 2LR/1 controlling only the one switch 2LR1. However the operation of the circuitry in FIG. 2 is identical with that of FIG. 1.

In use the lance 24 is lowered towards the metal bath and as soon as the lower end of the cartridge 26 contacts the bath surface an earth leakage current will flow from the live conductor 32 through the bath and the earth conductor 34 to trip the circuit breaker 22 and thus open the switch 2LR1. Opening of switch 2LR1 will inject the datum reading into the measuring equipment 18; the datum reading in this case being zero. Thereafter the equipment 18 will continue to indicate from this zero datum the depth of immersion of the cartridge 26 as it is lowered to a required depth into the metal bath.

A further modification of the invention is shown in FIG. 3 wherein a "bomb" disposable cartridge 38 is lowered from a position above the vessel into the metal bath. This cartridge 38 may be, for example, of the type used for determination of carbon level by thermo-couple measurement of liquidus arrest temperature. The electrical circuitry for this embodiment is identical with that of FIG. 2; the live lead 28 and the earth lead 30 being connected to responsive electrical conductors electrically insulated one from another within the cartridge 38 and extending to the lower surface thereof.

The leads 28 and 30 are wound around a reel 40 which is motor driven to raise or lower the cartridge 38 through an aperture 44 in the hood 42 over the vessel. Conveniently the aperture 44 is sealed against waste gas leakage by a sliding ram 46 and an argon purge main 48.

In use the ram 46 is retracted and the cartridge 38 is lowered from the reel 40 until it contacts the surface of the metal bath at which time an earth leakage current will be established from the live lead 28 through the bath and the earth lead 30. The resultant tripping of the circuit breaker will then inject a zero datum reading into the measuring equipment in an identical manner to that described with reference to FIG. 2. Thereafter the measuring equipment will continue to indicate from this zero datum the depth of immersion of the cartridge 38 as it is lowered to a required depth into the metal bath.

Alternatively the cartridge 38 may not be of the thermo-couple type but may merely be utilized for establishing the height of a datum reference level above the surface of the metal bath; such datum thereafter being used as a reference level against which the movement of an oxygen lance and/or a secondary lance may be calibrated. In such a mode the distance measuring equipment is set initially at zero when the cartridge 38 is at the position illustrated above the vessel. When the cartridge is lowered to contact the metal bath the actual distance travelled will be recorded on the measuring equipment as the circuit breaker is tripped by establishment of the earth leakage current thus indicating the true height of the datum level above the bath surface.

A further modification is illustrated in FIG. 4 wherein there is illustrated a triple port oxygen lance 50 of the type as may be used with reference to the FIG. 1 embodiment. However, in the FIG. 4 construction, disposable cartridge 52 is inserted in the discharge opening of one port; the cartridge having manually insulated electrical conductors therein connected respectively to the live and earth leads 28 and 30 of the circuitry of FIG. 2. The length of the cartridge 52 is known and it is this length measurement which is injected into the measuring equipment when the lower end of the cartridge 52 contacts the bath surface whereby the height of the lance 50 above the bath surface may thereafter be continuously indicated as the lance is moved towards or away from the bath surface.

In all the embodiments the earth leakage current, and hence the datum reading, has been described as being established when the electrical conductor(s) contact the surface of the metal bath. It will be appreciated that a metal bath being treated in a metallurgical vessel will have a slag layer at its surface, the thickness of which may be non-uniform across the diameter of the vessel. It may be desired to establish the datum reading for the lance or cartridge at the true slag/metal interface and to this end the earth leakage circuit breaker may have a sensitivity adjuster whereby the level of the earth leakage current required to trip the circuit breaker is higher than that which would be established upon contact of the conductor(s) with the slag layer. For the purpose of clarity therefore the term "surface of the metal bath" as used throughout this specification and claims will be understood to refer either to the slag layer upper surface or the slag/metal interface or some intermediate position dependent upon the sensitivity setting of the circuit breaker.

Also when both oxygen delivering and secondary lances are provided above a metallurgical vessel, providing the longitudinal separation between the lance tips can be measured in their parked positions, the measurement of a predetermined separation between one lance tip and the bath surface will enable the separation of both lances from the bath surface to be continuously recorded.

We claim:

1. Apparatus for determining the separation between first and second relatively movable objects comprising means connected to a first object for applying an electrical voltage to said first object, earth leakage current detection means electrically connected to said first object operable, upon establishment of an earth leakage current from said first object to earth through a second object connected to earth, when said first object contacts said second object, a circuit breaker triggered by said earth leakage current break an earth leakage circuit, and electrical means activated by said circuit breaker to initiate a reading on distance measuring means for recording the separation between the two objects.

2. Apparatus as claimed in claim 1 wherein the distance measuring means is presettable at a predetermined distance between the two objects and is actuable, on establishment of said earth leakage current, to record said predetermined distance and thereafter is operable to record subsequent variations from said predetermined distance upon relative movement between said two objects.

3. Apparatus as claimed in claim 2 wherein said first object is a lance and said second object is the surface of a bath of molten metal contained within a metallurgical vessel; the lance being movable towards and away from such surface.

4. Apparatus as claimed in claim 3 wherein an electrical conductor of predetermined length is secured to the lower end of the lance in such a manner that the earth leakage current is established upon contact of the conductor with the surface of the metal bath.

5. Apparatus as claimed in claim 4 wherein an earth connection is provided to the metal bath within the metallurgical vessel.

6. Apparatus as claimed in claim 4 wherein an earth connection is secured to the lower end of the lance of the same length as the said electrical conductor and is electrically insulated therefrom.

7. Apparatus as claimed in any one of claims 3 to 6 wherein the lance is an oxygen lance for blowing an oxidizing gas or gases on to the surface of the metal bath.

8. Apparatus as claimed in claim 3 wherein the lance is a sampling lance submersible below the surface of the molten metal bath, the said lance containing a disposable cartridge having a live electrical conductor and an earthed electrical conductor electrically insulated one from another: the earth leakage current being established between the two conductors when they contact the surface of the metal bath.

9. Apparatus as claimed in either one of claims 1 or 2 wherein said first object is a disposable cartridge and said second object is the surface of a bath of molten metal contained within a metallurgical vessel: the cartridge being movable towards and away from such surface and containing a live electrical conductor and an earthed electrical conductor electrically insulated one from another, the earth leakage current established between the two conductors when they contact the surface of the metal bath.

10. A method of determining the separation between first and second relatively movable objects comprising applying electrical voltage to a first one of said objects, moving one of said objects towards the other to establish an earth leakage circuit, detecting the establishment of an earth leakage current from said first object to earth when said first object contacts said second object, and passing said earth leakage current through a circuit breaker to trigger said circuit breaker to break said earth leakage circuit and activate electrical means in said earth leakage circuit to initiate a reading on distance measuring means for recording the separation between the two objects.

11. A method according to claim 10 wherein the earth leakage current is passed through recording means to actuate recordal of establishment of a predetermined distance between the two objects and thereafter continuing to pass said current through said recording means to record subsequent variations from said predetermined distance upon relative movement between the two objects.

* * * * *